United States Patent
DeForrest et al.

(10) Patent No.: US 6,343,709 B1
(45) Date of Patent: Feb. 5, 2002

(54) IMPACT RESISTANT SEALABLE CONTAINER

(75) Inventors: Allen L. DeForrest, Santa Ynez; Craig J. Kent, Solvang, both of CA (US)

(73) Assignee: Wild Ideas, LLC, Santa Barbara, CA (US)

( * ) Notice: Subject to any disclaimer, the term of this patent is extended or adjusted under 35 U.S.C. 154(b) by 0 days.

(21) Appl. No.: 09/515,986

(22) Filed: Mar. 1, 2000

Related U.S. Application Data
(60) Provisional application No. 60/122,766, filed on Mar. 3, 1999.

(51) Int. Cl.[7] ............................................. B65D 45/02
(52) U.S. Cl. .................... 220/327; 220/328; 220/4.33; 411/555
(58) Field of Search ............................... 220/327, 328, 220/325, 315, 3.8, 4.17, 4.33, 801–804; 411/554, 555

(56) References Cited

U.S. PATENT DOCUMENTS

| | | | | |
|---|---|---|---|---|
| 2,383,683 A | * | 8/1945 | Reidenbach | 411/555 |
| 2,818,626 A | * | 1/1958 | Ralph et al. | 411/555 |
| 3,317,072 A | * | 5/1967 | Zavertnik et al. | 220/327 |
| 4,059,199 A | * | 11/1977 | Quaney | 220/327 |
| 4,145,794 A | * | 3/1979 | Schenk | 411/555 |
| 4,378,615 A | * | 4/1983 | Gunther | 411/555 |
| 4,801,039 A | | 1/1989 | McCall et al. | |
| 4,993,575 A | * | 2/1991 | Maes | 220/327 |
| 5,238,137 A | * | 8/1993 | Cornwall | 220/327 |
| 5,361,925 A | * | 11/1994 | Wecke et al. | 220/325 |
| 5,411,161 A | | 5/1995 | Fish, Jr. | |
| 5,638,977 A | | 6/1997 | Bianchi | |
| 5,789,702 A | * | 8/1998 | Perella | 220/327 |
| 5,950,981 A | | 9/1999 | Judy | |

FOREIGN PATENT DOCUMENTS

JP    10-197695    * 7/1998

OTHER PUBLICATIONS
March 2000 advertisement entitled "Backpacker's Cache" in Backpacker Magazine, p. 193.

* cited by examiner

Primary Examiner—Nathan J. Newhouse
(74) Attorney, Agent, or Firm—Kenneth J. Hovet; Arthur K. Samora

(57) ABSTRACT

A impact resistant, sealable canister is provided comprising a wall structure having a lower edge portion joined to a base. A receiving collar is joined to an opposing top edge portion of the wall structure. The receiving collar includes an annular channel and an inner shoulder having fastener pads. The pads have fastener openings and stationary connector elements. A container lid releasably seals against the collar by operation of fastener parts retained in the lid that engage the collar connector elements. Gasket materials adjacent the collar periphery and around the fastener parts function to provide a reusable sealed canister useful for water activities and other outdoor involvements.

14 Claims, 5 Drawing Sheets

IMPACT RESISTANT SEALABLE CONTAINER

This application claims priority from provisional patent application No. 60/122,766 which was filed Mar. 3, 1999.

FIELD OF THE INVENTION

The present invention pertains generally to storage containers and, more particularly, to reusable, portable containers which are impact resistant and sealable. The invention may be used in military and aircraft storage applications or as a waterproof container for aquatic activities. Its impact resistance, light weight and sealability also make it useful for hiking and camping where marauding animals are a problem.

BACKGROUND OF THE INVENTION

Food storage containers for use by the backpacking community and for outdoor activities are known in the prior art. It is a concern that these containers should not attract animals and/or should be animal-proof, in the sense that they cannot be accessed by animals. This increases the safety of both the animals and the backpacking community by minimizing contact between animals and humans. In fact, certain national parks, such as Yosemite National Park, do not allow camping activities unless the campers' food is stored in an animal-proof container.

To be animal-proof, the container should first prevent animals from smelling any food within. To do this, the container should be airtight, to prevent the emitting of food odors which would attract wild animals. Second, in the event an animal realizes that food is in the container, the container must be able to prevent entry therein. To do this, the container should be made of extremely strong materials and should be constructed so that animals, particularly bears, cannot gain access with their claws for opening the container. At the same time, since the container is designed for use in the wilderness, the container must be easily accessible to humans requiring minimal use of a simple tool, such as a coin.

For optimum user satisfaction, in addition to the considerations enumerated above, the container must also be extremely lightweight, as it is to be carried by backpackers over great distances. It is desired to reduce the weight of the canister by as much as is feasible, while still retaining the animal-proof characteristics of the container.

U.S. Pat. No. 4,801,039, which issued to McCall et al. for an invention entitled "Animal Proof Container", discloses a container in which a combined lid and crown structure are sealingly attached to a can. The crown structure has flexible fingers that extend into the can and engage notches in the can sidewalls. To release the fingers and remove the lid, a rod is inserted into sidewall openings. This allows a user to push the fingers out of the recesses. The above procedure is clearly impractical and cumbersome. The fingers can break and the rod can be lost. To effectively release the lid, each of the fingers should be pushed simultaneously. Manufacturing costs will also be significant.

In light of the above, it is an object of the present invention to provide a storage container which is airtight and impermeable, to prevent the emitting of food odors which would attract wild animals. It is another object of the present invention to provide a food container which will prevent access by animals up to and including the size of a bear. Another object of the present invention is to provide a container which can quickly and easily be opened by humans by using a simple implement. It is another object of the present invention to provide a container that is extremely lightweight. Another object of the present invention is to provide a container that is relatively easy to manufacture in a cost effective manner.

SUMMARY OF THE INVENTION

The container of the present invention includes a base and a closed wall structure having a top edge portion and an opposing lower edge portion which is fixed to the base. This defines an interior storage space with a top opening. The container further includes a receiving collar having a peripheral outer wall with a collar rim and a bottom side which is fixed to the wall top edge portion. The collar has an upper side with interior shoulder means to support quick connect assemblies for releasable engagement with a lid.

The lid is sized to enclose the container open end and fit within the peripheral outer wall. The lid underside includes an offset outer lip structure that engages collar abutment means to effect a sealing engagement. When the lid is sealingly engaged to the container, the exterior face of the lid will be flush with the collar rim. This feature eliminates exposed edges and inhibits animals from gaining access to the container interior with their claws.

The collar abutment means may comprise any combination of interfitting lid/collar structures that include a sealable gasket means. The objective is to make the container airtight and prevent water ingress or the emitting of odors from the container interior.

As one of the prime advantages of the container is its decreased weight, the selection of materials for the container is important. In addition to light weight, the materials must be selected so that the container has sufficient structural strength to withstand crushing attempts by an animal as large as a bear. With these considerations in mind, the base, receiving collar and lid are preferably constructed of a lightweight material, such as metal. The wall is preferably made of a light non-metal material with significant strength-to-weight properties such as, but not limited to, ultra density (UD) carbon, s-glass, Kevlar® and combinations thereof. Because these materials are dissimilar, in the sense that they cannot be welded, the receiving collar and base are attached to the wall with adhesives, bonding materials and overlays. A fillet is formed in the joint where the collar and base are secured to the wall, to remove any sharp edges.

The quick connect assemblies comprise a movable fastener part retained in the lid and a connector element fixed to the collar at the shoulder means. Operation of the fastener part will cause its engagement with the connector element and draw the lid against the abutment means to effect a sealing engagement.

BRIEF DESCRIPTION OF THE DRAWINGS

The novel features of this invention will be best understood from the accompanying drawings, taken in conjunction with the accompanying description, in which similar characters refer to similar parts, and in which.

WRITTEN DESCRIPTION OF THE PREFERRED EMBODIMENT

Figure 1:
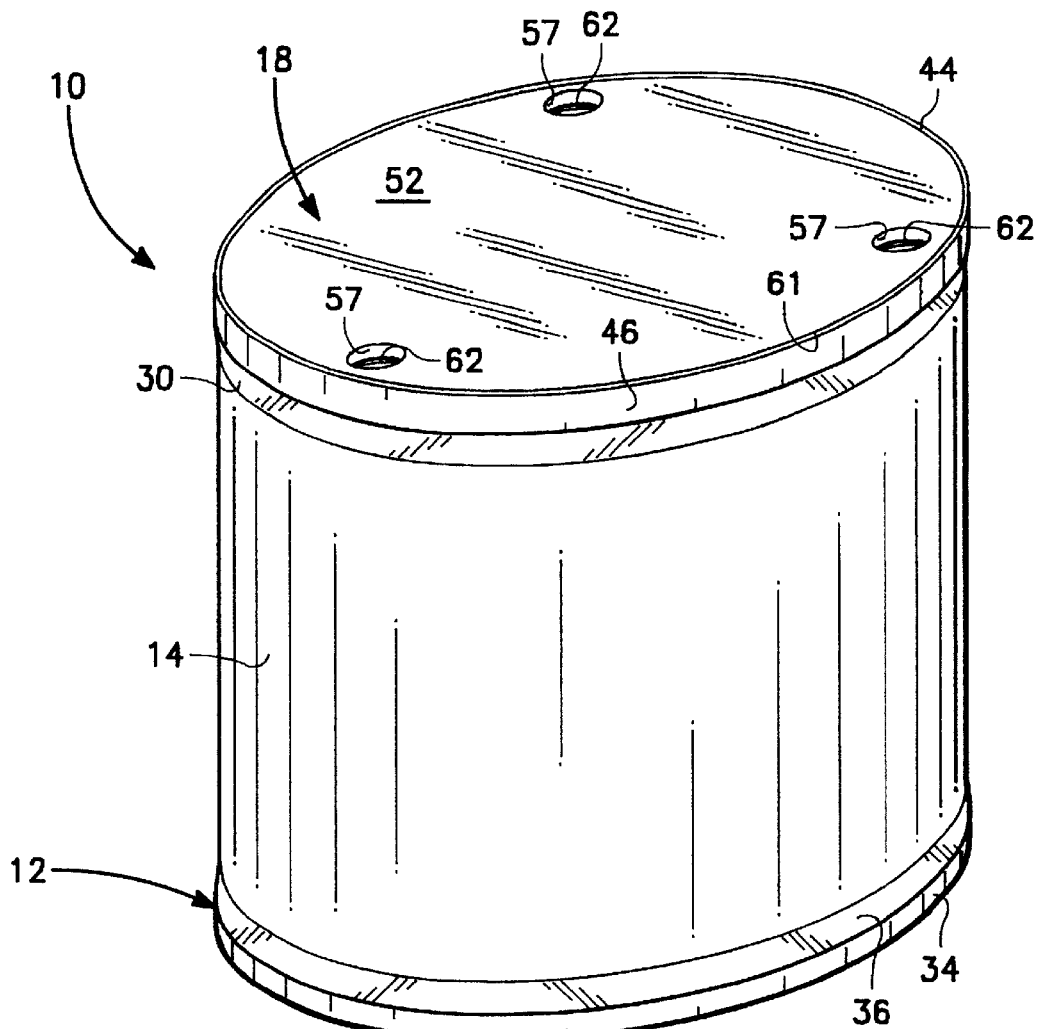
FIG. 1 is a top isometric view of the overall container and lid of the invention.

With reference now to the drawings, the container of the present invention is shown and generally designated by reference character 10. In overview, the container essentially consists of a base 12, a wall structure 14 that is attached to the base and projects therefrom, a receiving collar 16 which is mounted upon wall top edge portion 26, and a lid 18. The lid is releasably secured to the collar with a plurality of quick connect assemblies shown generally by reference 20. The wall structure forms the container body which is preferably circular in shape, with a predetermined wall thickness, diameter and height. Oval, oblong and polygonal cross-sectional shapes could also be used as dictated by consumer choice and end user requirements.

Figure 9:
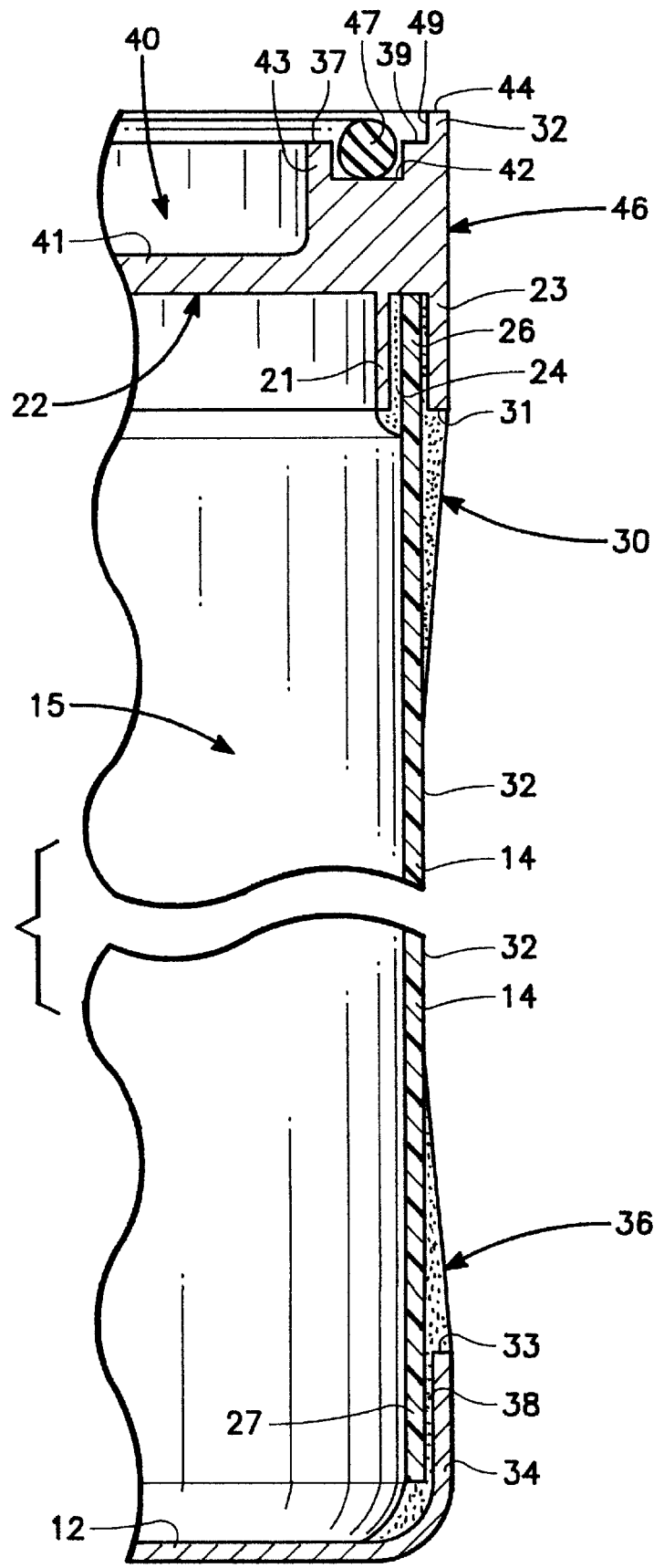
FIG. 9 is a fragmentary side cross-sectional view of the container shown in FIG. 1 with the lid removed.

The base will have a cross-sectional shape that is coextensive with at least the wall structure lower edge portion 27. As best shown in FIG. 9, the base has a bowl-like configuration with an upstanding side wall 34. The side wall overlaps the outside of wall lower edge portion 27 to form base joint 38. The base joint is permanently sealed and covered as discussed below.

Figure 5:
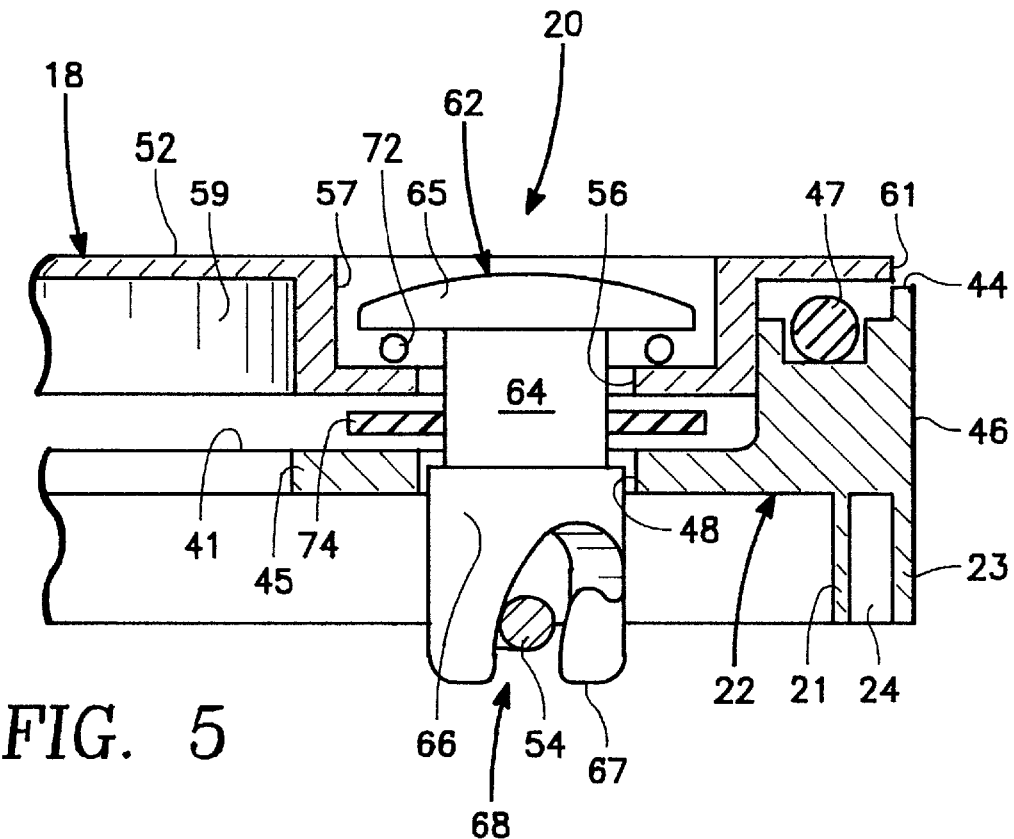
FIG. 5 is an enlarged fragmentary view taken along lines 5—5 of FIG. 3 showing the fastener part and lid in a loose position.
Figure 6:
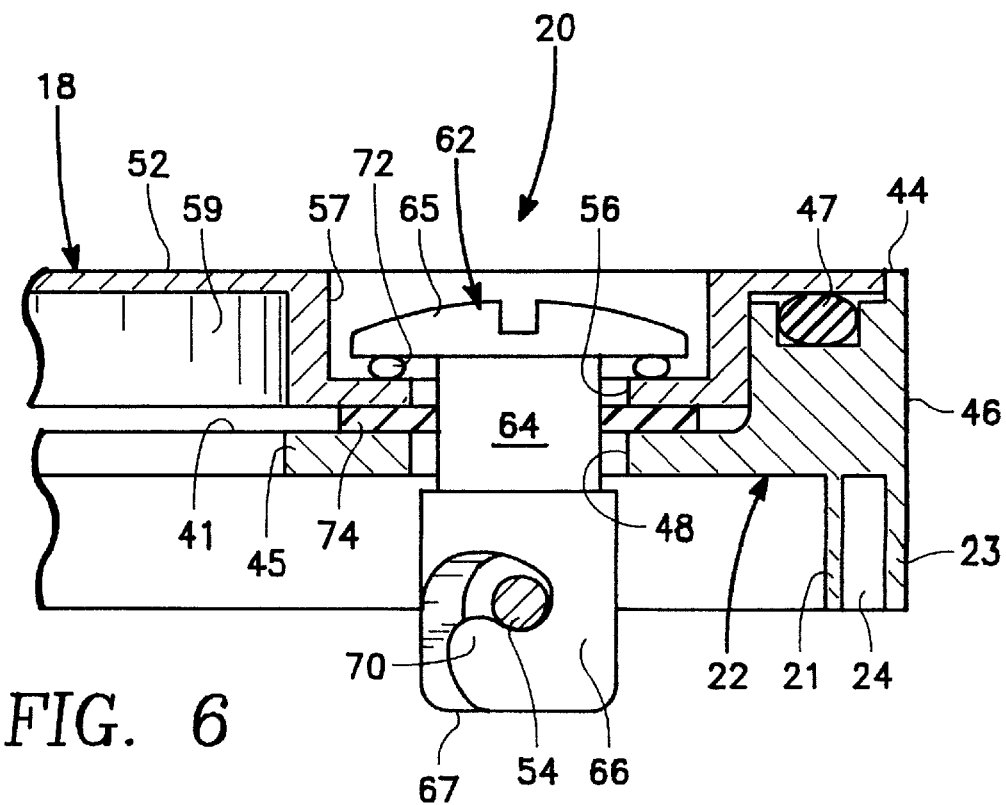
FIG. 6 is a view similar to FIG. 5 showing the fastener part and lid in a tightened position.

As best seen in FIGS. 5, 6 and 9, spaced-apart annular collar flanges 21, 23 extend downwardly from the bottom side 22 of collar 16. The collar flanges define wall slot 24 with flange 23 comprising a lower section of collar outer wall 46. The slot width and diameter are about coextensive with the thickness and diameter of the edge portion 26 so that the edge portion will fit into the wall slot.

To permanently fix the wall top edge portion 26 to wall slot 24, securement means known in the art may be used such as heat or sonic welding, solvent bonding, mechanical fastening means, fusion processes and adhesives. In a preferred embodiment whereby the wall structure is Kevlar® and the base is a metal alloy, a Hysol® adhesive is used. The same securement means will be applicable for permanently fixing and sealing base joint 38. To eliminate exterior rough edges, the bottom edge 31 of collar outer wall 46 and the base side wall upper edge 33 are covered with an adhesive compound shown as base fillet 36 and collar fillet 30.

The upper side 40 of the collar comprises an outer wall 46 with an upper wall section 32 having a rim 44. Extending inwardly from inner surface 49 of the wall section, below rim 44, is offset surface 39. The offset surface extends further inwardly and merges with gasket channel 42. The inward side of the channel comprises subwall 43 which has an upper end 37 that is about coextensive with offset surface 39.

The width and depth of channel 42 will be dictated by the type and cross-sectional shape of the abutment means being utilized. Most commonly, the abutment means will comprise a resilient gasket material that can extend above upper end 37 and offset surface 39 to allow direct sealing contact with the lid in a manner to be described. In the preferred embodiment shown, an elastic O-ring 47 is used having a diameter that is greater than the depth of the channel. Flat washer-like gaskets could also be used. In such case, the channel would be replaced with a flat surface coextensive with end 37 and offset surface 39.

Offset downwardly from upper end 37 is shoulder 41. The shoulder extends radially inwardly from channel subwall 43. It defines a flat horizontal surface from which extends interior shoulder means shown as fastener pads 45. The pads provide an anchor for the quick release assemblies 20. Other shoulder means such as interior wall straps, hooks, rings, eye bolts and the like could also be used.

Figure 2:
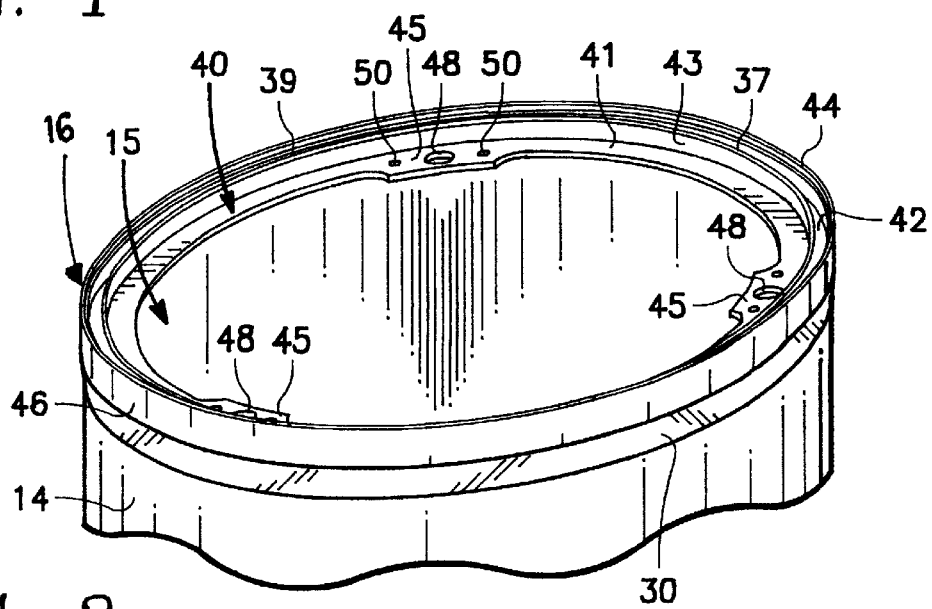
FIG. 2 is a fragmentary isometric view of the container top shown in FIG. 1 with the lid removed.
Figure 3:
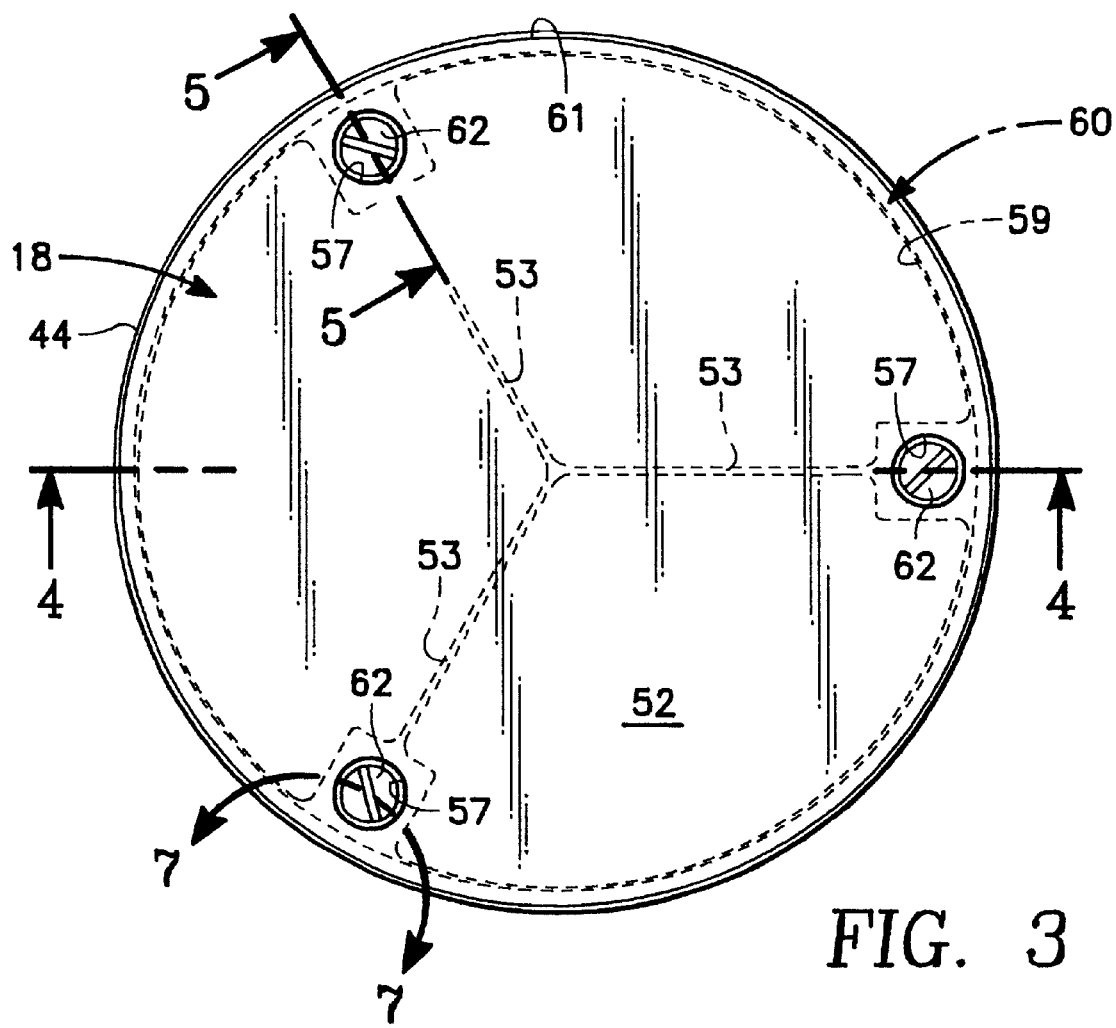
FIG. 3 is a top plan view of the lid shown in FIG. 1.
Figure 4:
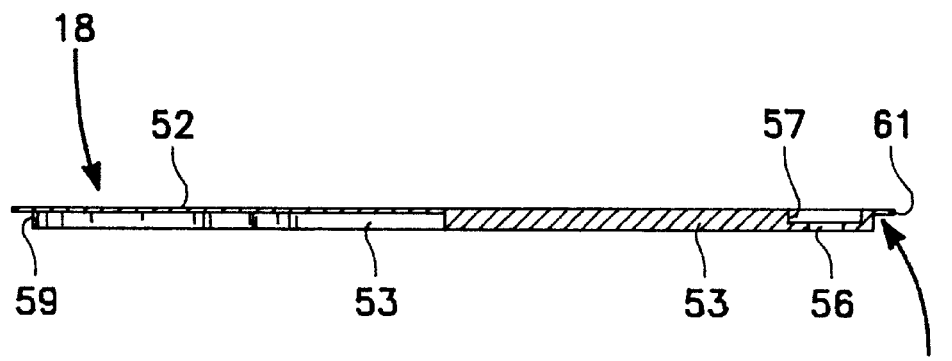
FIG. 4 is a cross-sectional view taken along the lines 4—4 of FIG. 3.

As best illustrated in FIG. 2, the fastener pads comprise an enlarged inwardly directed portion of shoulder 41. Three pads are shown spaced equal distance apart about the inner circumference of the shoulder. Additional pads could be used to effect an evenly distributed hermetic seal.

Each pad is provided with a fastener opening 48 proximate the pad midsection. The fastener opening is sized to permit passage of fastener part 62 in a manner to be described.

On opposite sides of each fastener opening are downwardly extending connector posts 50. The posts have an enlarged free end to provide a secure engagement with opposing curled ends 55 of connector element 54. The connector element comprises a relatively stiff rod or bar that is offset a predetermined distance from the pad underside and crosses beneath fastener opening 48.

Lid 18 is a solid plate-like member having an exterior face 52 and underlying support ribs 53. Lid openings 56 extend through the lid and are radially and angularly located to correspond with the collar fastener openings 48. The lid openings are set within lid recesses 57.

The planar shape and circumference of lid outer edge 61 is dictated by the inner surface 49 of upper wall section 32. It is desired to have the lid outer edge closely interfit with the inner surface to eliminate any gap large enough to permit access with an animal claw.

For the same reason, it is desirable to have the lid exterior face 52 flush with collar rim 44. This is accomplished by ensuring that the outermost lip portion 60 of the lid does not have a thickness greater than the vertical distance between collar offset surface 39 and collar rim 44.

The quick connect assembly 20 comprises a movable fastener part 62 which interacts with connector element 54 to sealingly lock down lid 18 to the receiving collar 16. The fastener part consists of a shaft 64 having a lower locking portion 66 that extends to a terminal end 67. The locking portion includes an engagement means for releasable attachment to said connector element. The engagement means may comprise ratchet mechanisms, cam devices, sleeve and screw combinations, off-center hinged latches and related apparatus. Such means may combine with parts of the aforementioned shoulder means to effect the desired locking action.

As illustrated, the locking portion has a center core area that is hollow thereby creating a tubular wall structure. A horizontal slot 68 extends upwardly from the terminal end along a helical pathway having an axis of rotation coextensive with the shaft center axis. At a predetermined point corresponding to about one quarter turn, the slot turns downwardly a short distance sufficient to form a cusp 70 in opposing sides of the tubular wall structure.

The upper end of shaft 64 includes a slotted head 65. The head diameter is larger than lid opening 56, but smaller than the diameter of lid recesses 57. The head thickness should also be less than the recess depth. To provide a seal around the lid openings, a small gasket shown as O-ring 72 is placed in recess 57 beneath the margins of head 65.

For additional sealing about the lid openings and to conveniently retain the fastener parts within the lid openings, a retainer means is provided. Such means may comprise pins, clips, sleeves, washers, rings and the like. As shown, the preferred retainer means is a flat gasket 74 which is placed around shaft 64 below the lid opening 56 adjacent the recess underside. The gasket is sized to frictionally engage shaft 64 and inhibit dislodgement of the fastener part from the lid. The flat gasket also provides primary sealing about fastener openings 48.

Figure 7:
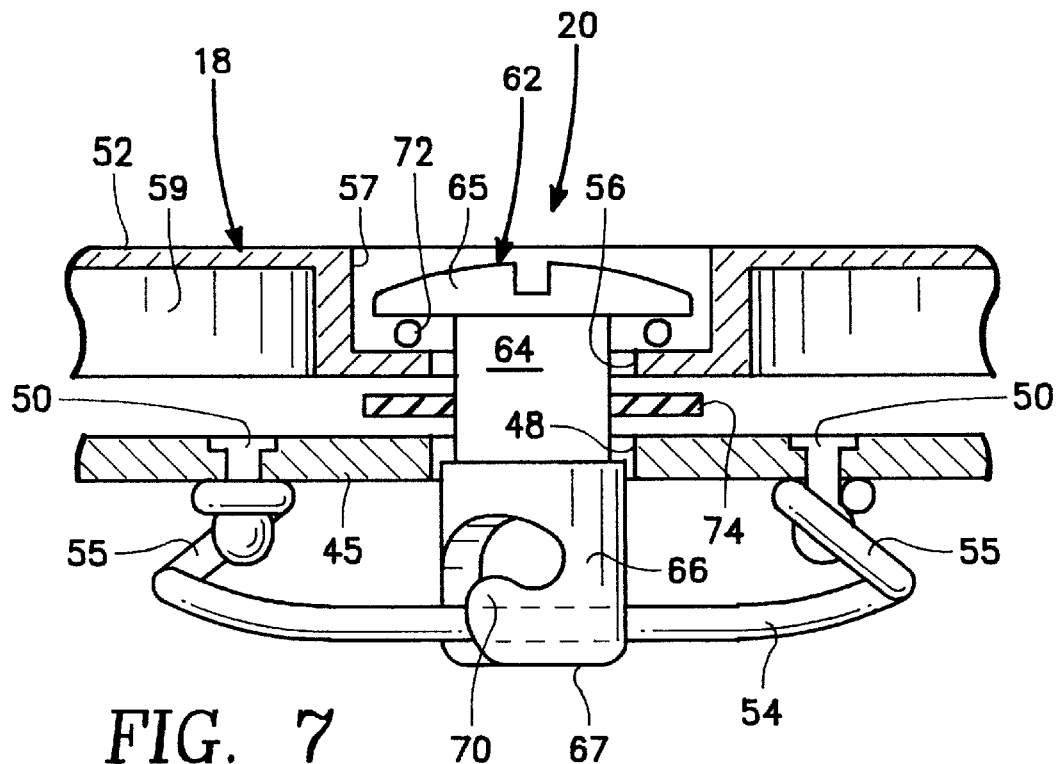
FIG. 7 is an enlarged cross-sectional view taken along lines 7—7 of FIG. 3 showing the fastener part and lid in a loose position relative to the connector element.

In operation, a user may place foodstuffs, toiletries, clothing, valuables or any other item which one wishes to keep dry and away from animals, into the container interior 15. The lid is then placed upon the collar and adjusted to match the fastener parts 62 with the collar fastener openings 48. The slotted head 65 is rotated until connector element 54 is loosely within slot 68 as depicted in FIGS. 5 and 7.

Figure 8:
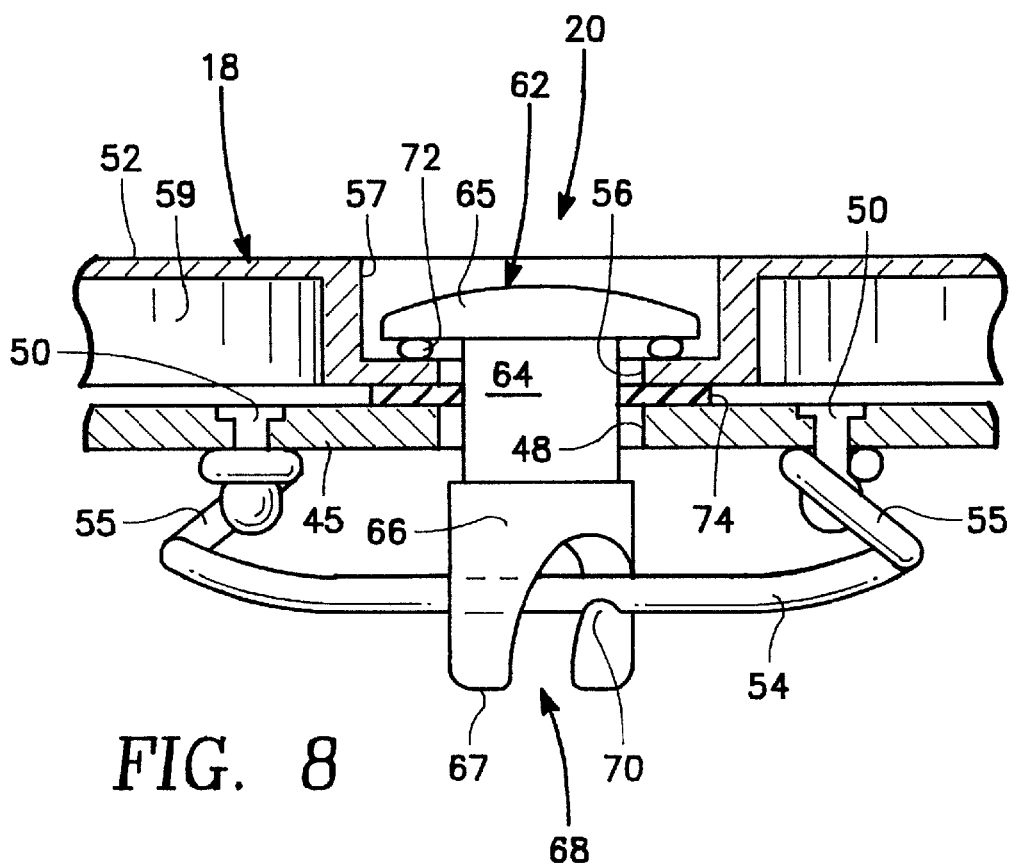
FIG. 8 is a view similar to FIG. 7 showing the fastener part and lid in a tightened position relative to the connector element.

Thereafter, slotted head 65 is engaged with a bladed screwdriver, coin or other thin implement and the fastener part is rotated about one quarter turn until the connector element becomes cradled behind cusp 70. Because the slotted helical pathway has an axial dimension and the connector element remains stationary, rotation of the fastener part will move the slotted head downwardly against small O-ring 72 and flat gasket 74. Simultaneously, lid lip portion 60 will compress channel O-ring 47. The result will be a tightly secured lid that is hermetically sealed as illustrated in FIG. 6 and 8.

To remove the lid, the fastener parts 62 are rotated in an opposite direction. This action moves terminal end 67 closer to connector element 54 and increases the vertical distance between the slotted head 65 and the connector element. When the connector element and slot opening at the terminal end are in alignment, disengagement can occur and the lid may be removed from the collar.

While the particular container, as herein shown and disclosed in detail, is fully capable of obtaining the objects and providing the advantages above stated, it is to be understood that the presently preferred embodiments are merely illustrative of the invention. As such, no limitations are intended other than as defined in the appended claims.

What is claimed is:

1. A container comprising:
    a closed wall structure having a lower edge portion and a top edge portion defining a top opening for said container;
    a base sealed to said lower edge portion;
    a collar sealed to said top edge portion;
    said collar having an outer wall and an inwardly directed shoulder with fastener openings, said collar outer wall having a rim and an inner wall surface with an offset surface extending inwardly from said inner wall surface below said rim;
    a connector element attached to said shoulder below each fastener opening;
    a lid sized to sealably enclose said top opening and having a fastener part for each respective fastener opening, said lid having a peripheral lip portion that is coextensive with said inner wall surface;
    said fastener part including a locking portion that passes through a respective fastener opening; and,
    said locking portion having engagement means for releasable attachment to a respective connector element.

2. The container of claim 1 wherein said collar includes a channel that is spaced inwardly from said offset surface, said channel including an abutment means for engaging said peripheral lip portion.

3. The container of claim 1 wherein said lid includes lid openings through which extends a respective fastener part.

4. The container of claim 3 wherein said lid openings are located within recesses in said lid, said fastener part having an enlarged head that fits within a respective recess.

5. The container of claim 4 wherein said recess includes a small gasket positioned within said recess below said enlarged head.

6. The container of claim 4 wherein said recesses have a recess underside and said fastener part includes a retainer means positioned below each one of said lid openings proximate said recess underside for holding said fastener part within said lid openings.

7. The container of claim 1 wherein said lip portion has a thickness which is less than the vertical distance between said rim and said offset surface.

8. The container of claim 1 wherein said fastener part has a longitudinal axis and said connector element comprises a rod, said locking portion having a terminal end into which extends a horizontal slot sized to accommodate said rod, said slot formed about a helical pathway having an axis of rotation coextensive with the fastener part longitudinal axis.

9. A container comprising:
    a base;
    a wall structure sealingly fixed to said base, said wall structure having a top edge portion;
    a receiving collar having a bottom side and a top side, said bottom side sealingly fixed to said top edge portion, said top side including an inwardly directed shoulder;
    said shoulder having spaced-apart fastener openings with connector elements;
    a lid removably attached to said receiving collar, said lid including recesses through which lid openings extend and having fastener parts for extending through said lid openings and said fastener openings for engaging said connector elements;
    each fastener part comprising a shaft from which extends a locking portion having engagement means for releasable attachment to a connector element, each fastener part further including a head and retainer means for holding said fastener part within said lid opening;
    said fastener head being larger than said lid opening and smaller than said recess; and,
    said recess including a small gasket beneath said head and said retainer means comprising a flat gasket that frictionally engages said fastener part beneath said lid opening.

10. The container of claim 9, wherein said connector element comprises a cross rod that is fixed to said shoulder a predetermined distance beneath said fastener opening.

11. The container of claim 10, wherein said locking portion includes a helical slot that engages said cross rod upon rotation of said fastener part.

12. The container of claim 10, wherein said collar top side includes a channel containing a gasket material.

13. A method for manufacturing a sealable impact resistant container which comprises the steps of:
    forming a closed wall structure having a lower edge portion and a top edge portion defining a top opening for said container;

sealing a base to said lower edge portion;

sealingly mounting a receiving collar to said top edge portion, said collar having an outer wall and an inwardly directed shoulder with fastener openings, said collar outer wall having a rim and an inner wall surface from which extends an offset surface, wherein said lid has a peripheral lip portion coextensive with said inner wall surface;

forming a channel in said collar spaced inwardly from said offset surface;

placing a gasket material in said channel so that at least a portion of said material extends above said offset surface;

attaching a respective connector element to said shoulder below each fastener opening;

providing a lid sized to sealably enclose said top opening and having a fastener part for each respective fastener opening, said fastener part including a locking portion that passes through a respective fastener opening, said locking portion having an engagement means; and attaching each engagement means to a respective connector element.

14. The method of claim 13 wherein said fastener parts have enlarged heads and further comprising the steps of:

forming a plurality of lid recesses corresponding to the locations of said fastener openings in said collar, said enlarged heads fitting within respective recesses;

creating a lid opening in each of said recesses, said lid opening being sized and shaped for receiving a fastener part; and, positioning a small gasket material within each recess below said enlarged head.

* * * * *